United States Patent
Tsuji et al.

(10) Patent No.: US 12,546,960 B2
(45) Date of Patent: Feb. 10, 2026

(54) OPTICAL DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Masatoshi Tsuji, Nisshin (JP); Hiroshi Ando, Nisshin (JP); Kazuyuki Ishihara, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 708 days.

(21) Appl. No.: 17/950,347

(22) Filed: Sep. 22, 2022

(65) Prior Publication Data
US 2023/0118387 A1    Apr. 20, 2023

(30) Foreign Application Priority Data
Oct. 15, 2021  (JP) .................................. 2021-169515

(51) Int. Cl.
G02B 6/42      (2006.01)
B60R 1/00      (2022.01)
B60R 1/12      (2006.01)
G02B 5/26      (2006.01)

(52) U.S. Cl.
CPC ............ *G02B 6/4277* (2013.01); *B60R 1/007* (2013.01); *B60R 1/12* (2013.01); *G02B 5/265* (2013.01)

(58) Field of Classification Search
CPC ...... G02B 6/4277; G02B 5/265; G02B 5/045; G02B 6/00; G02B 27/0018; B60R 1/007; B60R 1/12; B60R 1/10

USPC ......................................................... 359/601
See application file for complete search history.

(56) References Cited

U.S. PATENT DOCUMENTS

| | | | |
|---|---|---|---|
| 5,719,649 A * | 2/1998 | Shono .................. | G02B 6/0036 362/617 |
| 2018/0232866 A1* | 8/2018 | Weller .................. | G02B 30/30 |
| 2023/0058463 A1 | 2/2023 | Ando et al. | |

FOREIGN PATENT DOCUMENTS

JP            6372305 B2      8/2018

OTHER PUBLICATIONS

Takahashi Yuichi et al. JP2015143087A, Examiner provided machine translation (Year: 2015).*
U.S. Appl. No. 18/190,313, filed Mar. 27, 2023, Ishihara et al.

* cited by examiner

*Primary Examiner* — Bumsuk Won
*Assistant Examiner* — Rahman Abdur
(74) *Attorney, Agent, or Firm* — Posz Law Group, PLC

(57) ABSTRACT

An optical device includes a light guide and a light shielding portion. The light guide has: an incident surface on which an external scene light coming from a blind area is incident; a first surface including flat portions and prism portions; and a second surface opposite to the flat portions. The light shielding portion is provided on a surface of the light guide or at a position away from the light guide so as to block an outside light entering the light guide. The light shielding portion has a first light shielding portion for blocking light incident on an inclined surface and a second light shielding portion for blocking light incident on the flat portion in a predetermined direction.

16 Claims, 9 Drawing Sheets

OPTICAL DEVICE

CROSS REFERENCE TO RELATED APPLICATION

This application is based on Japanese Patent Application No. 2021-169515 filed on Oct. 15, 2021, the disclosure of which is incorporated herein by reference.

TECHNICAL FIELD

The present disclosure relates to an optical device in which light incident from an incident surface of a light guide propagates inside the light guide and exits from an exit surface.

BACKGROUND

An optical device includes a light guide, a semi-transmissive flat mirror, a plane mirror, and a prism sheet having prisms. The light guide has an incident surface on which an external scene light is incident, a first surface where the external scene light entering the light guide from the incident surface reaches for the first time, and a second surface opposite to the first surface. The semi-transmissive flat mirror is provided on the first surface of the light guide, and the plane mirror is provided on the second surface. The semi-transmissive flat mirror is located between the prism sheet and the light guide.

SUMMARY

According to the first aspect of the disclosure, an optical device includes a light guide and a light shielding portion, and is configured to display an external scene image of a blind spot area for a viewer when an obstacle is within a view field of the viewer. The light guide has: an incident surface on which an external scene light coming from a blind area is incident; a first surface having a plurality of flat portions and a plurality of prism portions, the external scene light incident from the incident surface reaching the first surface for the first time; and a second surface located opposite to the plurality of flat portions of the first surface. The light shielding portion is provided on a surface of the light guide or at a position away from the light guide so as to block an outside light from entering the light guide. The plurality of flat portions of the first surface totally reflects the external scene light traveling inside the light guide toward the second surface. The second surface totally reflects the external scene light reflected by the plurality of flat portions toward the first surface. Each of the prism portions has an exit surface for outward emitting a part of the external scene light incident from the incident surface and a part of the external scene light reflected by the second surface, and an inclined surface located opposite to the viewer with respect to the exit surface. The light shielding portion has a first light shielding portion configured to block an outside light incident on the inclined surface and a second light shielding portion configured to block an outside light incident on the flat portion in a predetermined direction. In a cross-sectional view including a normal to the exit surface and a normal to the flat portion, $\theta$ is an angle formed between the normal to the flat portion and a line connecting a center of a predetermined exit surface and an eyepoint center of the viewer, L is a distance between the center of the predetermined exit surface and the eyepoint center, DL is a distance between the eyepoint center and an outer edge of an eyelips of the viewer opposite to the light guide in a direction perpendicular to the line connecting the center of the predetermined exit surface and the eyepoint center, $\theta$ min is an angle represented by $\theta - \tan^{-1}$ (DL/L), a straight line A passes through a point where the exit surface and the inclined surface intersect with each other and the straight line A is incident on the flat portion with the angle $\theta$ min relative to the normal to the flat portion, a straight line B is parallel to the straight line A and incident on a point where the inclined surface and the flat portion intersect with each other, a point P1 where the straight line A intersects with the flat portion, a point P2 where the straight line B intersects with the flat portion, a point P3 where the exit surface intersects with the flat portion, a distance Fa is defined between the point P1 and the point P3, a distance Fb is defined between the point P2 and the point P3, Fa<Fb is satisfied, and the second light shielding portion is arranged so as to overlap the straight line A and the straight line B.

DETAILED DESCRIPTION

Figure 1:
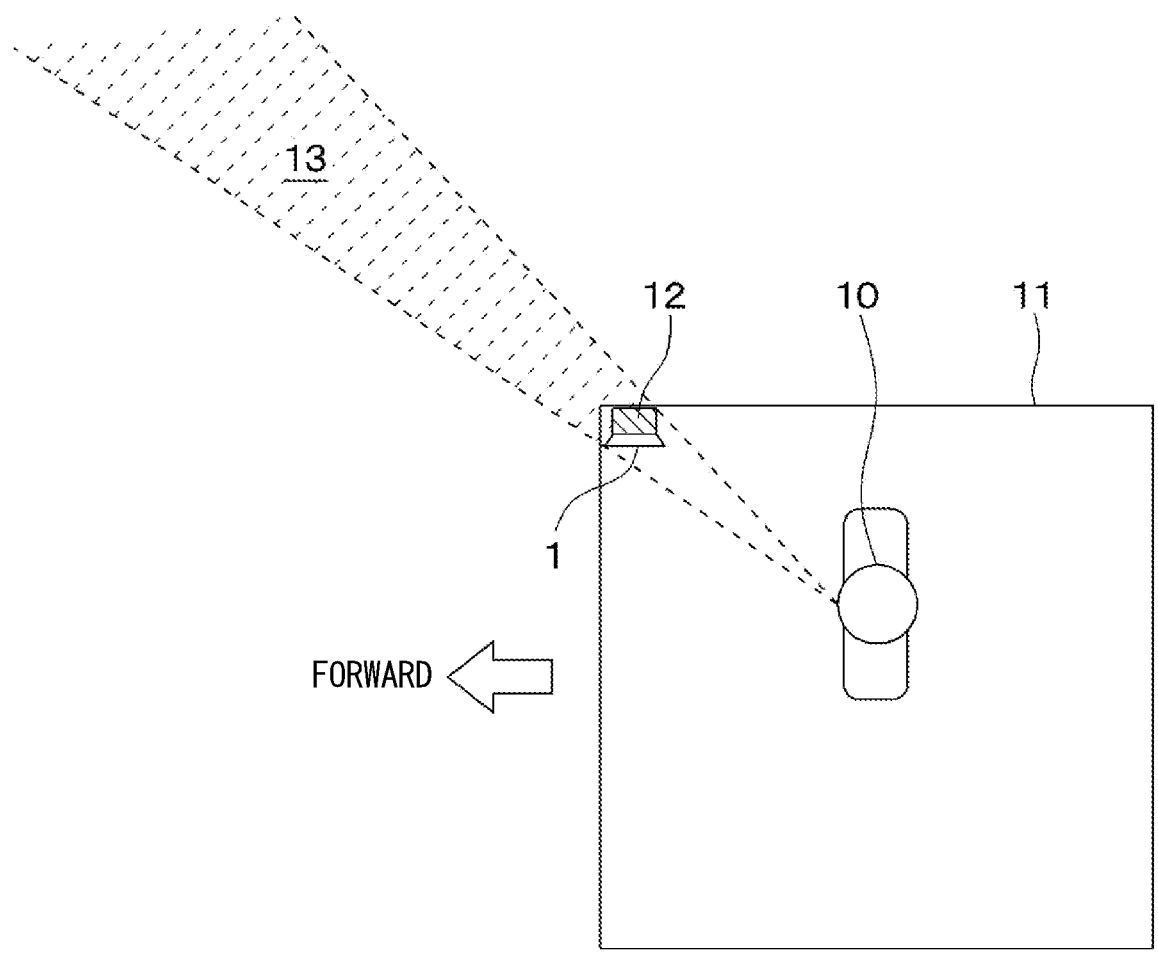
FIG. 1 is a schematic diagram showing an optical device according to a first embodiment, which is mounted on a device in which a viewpoint of a viewer is fixed.

To begin with, examples of relevant techniques will be described. An optical device includes a light guide, a semi-transmissive flat mirror, a plane mirror, and a prism sheet having prisms. The light guide has an incident surface on which an external scene light is incident, a first surface where the external scene light entering the light guide from the incident surface reaches for the first time, and a second surface opposite to the first surface. The semi-transmissive flat mirror is provided on the first surface of the light guide, and the plane mirror is provided on the second surface. The semi-transmissive flat mirror is located between the prism sheet and the light guide.

A part of the external scene light incident from the incident surface of the light guide is reflected to the second surface by the semi-transmissive flat mirror, and the reflected light is reflected to the first surface by the plane mirror. A part of the light that is not reflected by the semi-transmissive flat mirror is absorbed by the semi-transmissive flat mirror, and the rest of the light is transmitted through the semi-transmissive flat mirror and emitted to the outside from the exit surface of the prism. The exit surface of the prism faces a viewer. Thereby, the viewer can visually recognize the external scene through the optical device. This optical device is used, for example, as a blind spot auxiliary device that allows a viewer to visually recognize an external scene in a blind spot area that is blocked by a predetermined obstacle and cannot be directly viewed by the viewer.

In the optical device, the semi-transmissive flat mirror is composed of a vapor-deposited metal film or a dielectric multilayer coating film. However, since the vapor-deposited metal film has a high absorption rate of light, if the semi-transmissive flat mirror is composed of a single-layer vapor-deposited metal film, the loss in light reflection at the semi-transmissive flat mirror increases. In this case, the sight visually recognized by the viewer through the optical device looks dark.

The dielectric multilayer coating film has a lower light absorption rate than the single-layer vapor-deposited metal film. Therefore, if the semi-transmissive flat mirror is composed of a dielectric multilayer coating film, the loss of light due to the semi-transmissive flat mirror can be suppressed. However, the dielectric multi-layer coating film requires more manufacturing steps than the vapor-deposited metal film, which increases the manufacturing cost of the optical device. In addition, since the reflectance of the dielectric multilayer coating film changes depending on the incident angle and wavelength of light, the brightness and color tone of the external scene change depending on the angle at which the viewer views the first surface of the light guide. The inventors of the present disclosure provide a flat portion between the prisms and eliminate the semi-transmissive flat mirror so as to totally reflect the external scene light traveling inside the light guide. Note that this configuration is created by the inventors, and is not a conventional technology.

However, as a result of detailed studies by the inventors, it was found that such a configuration of the optical device has the following issues. That is, if an outside light is incident on the flat portion at an angle symmetrical to an external scene light emitted from the exit surface of the optical device toward the eyelips of the viewer, relative to a normal line of the flat portion, the outside light may be reflected by flat portion and reach the eyelips of the viewer. In addition, the outside light may propagate through the light guide from the flat portion and then be emitted from another flat portion to reach the eyelips of the viewer. In that case, the outside light is superimposed on the external scene light emitted from the exit surface of the optical device and is visually recognized by the viewer. The present disclosure provides an optical device capable of improving the visibility of an external scene image.

In order to achieve the above object, according to the first aspect of the disclosure, an optical device includes a light guide and a light shielding portion, and is configured to display an external scene image of a blind spot area for a viewer when an obstacle is within a view field of the viewer. The light guide has: an incident surface on which an external scene light coming from a blind area is incident; a first surface having a plurality of flat portions and a plurality of prism portions, the external scene light incident from the incident surface reaching the first surface for the first time; and a second surface located opposite to the plurality of flat portions of the first surface. The light shielding portion is provided on a surface of the light guide or at a position away from the light guide so as to block an outside light from entering the light guide. The plurality of flat portions of the first surface totally reflects the external scene light traveling inside the light guide toward the second surface. The second surface totally reflects the external scene light reflected by the plurality of flat portions toward the first surface. Each of the prism portions has an exit surface for outward emitting a part of the external scene light incident from the incident surface and a part of the external scene light reflected by the second surface, and an inclined surface located opposite to the viewer with respect to the exit surface. The light shielding portion has a first light shielding portion configured to block an outside light incident on the inclined surface and a second light shielding portion configured to block an outside light incident on the flat portion in a predetermined direction. In a cross-sectional view including a normal to the exit surface and a normal to the flat portion, $\theta$ is an angle formed between the normal to the flat portion and a line connecting a center of a predetermined exit surface and an eyepoint center of the viewer, L is a distance between the center of the predetermined exit surface and the eyepoint center, DL is a distance between the eyepoint center and an outer edge of an eyelips of the viewer opposite to the light guide in a direction perpendicular to the line connecting the center of the predetermined exit surface and the eyepoint center, $\theta$ min is an angle represented by $\theta - \tan^{-1}(DL/L)$, a straight line A passes through a point where the exit surface and the inclined surface intersect with each other and the straight line A is incident on the flat portion with the angle $\theta$ min relative to the normal to the flat portion, a straight line B is parallel to the straight line A and incident on a point where the inclined surface and the flat portion intersect with each other, a point P1 where the straight line A intersects with the flat portion, a point P2 where the straight line B intersects with the flat portion, a point P3 where the exit surface intersects with the flat portion, a distance Fa is defined between the point P1 and the point P3, a distance Fb is defined between the point P2 and the point P3, Fa<Fb is satisfied, and the second light shielding portion is arranged so as to overlap the straight line A and the straight line B.

Accordingly, since the second light shielding portion is arranged so as to overlap the straight lines A and B, an outside light arriving at the flat portion at an incident angle equal to or greater than the straight line A is blocked by the second light shielding portion, and the outside light is restricted from being reflected by the flat portion towards the eyelips of the viewer. In addition, if the outside light travels from the flat portion into the light guide and is reflected by the second surface, the outside light is restricted from being emitted from another flat portion toward the eyelips of the viewer. Moreover, the first light shielding portion prevents an outside light from traveling from the inclined surface into the light guide and from exiting from the flat portion or the exit surface toward the eyelips of the viewer. Therefore, the outside light is restricted from being superimposed on the external scene image of the blind area displayed for the viewer. Therefore, this optical device can clearly display the external scene image of the blind area to the viewer and improve the visibility thereof.

The reference numerals attached to the components and the like indicate an example of correspondence between the components and the like and specific components and the like in embodiments to be described below.

Hereinafter, embodiments of the present disclosure will be described with reference to the drawings. In the following embodiments, the same or equivalent parts are denoted by the same reference numerals, and their descriptions will be omitted.

First Embodiment

An optical device according to a first embodiment will be described with reference to FIGS. 1 to 6. As shown in FIG.

1, the optical device 1 of the present embodiment is mounted on a device 11 in which a viewpoint of a viewer 10 is fixed. In this embodiment, a vehicle will be described as an example of the device 11. The vehicle is provided with a front pillar 12 as an obstacle within the forward view field of the viewer 10 (for example, a driver). The optical device 1 is provided on the vehicle interior side of the front pillar 12. The optical device 1 functions as a blind spot auxiliary device that can display an external scene image of a blind spot area 13 for the viewer 10. The blind spot area 13 is not directly viewed by the viewer 10 due to the front pillar 12.

Figure 2:
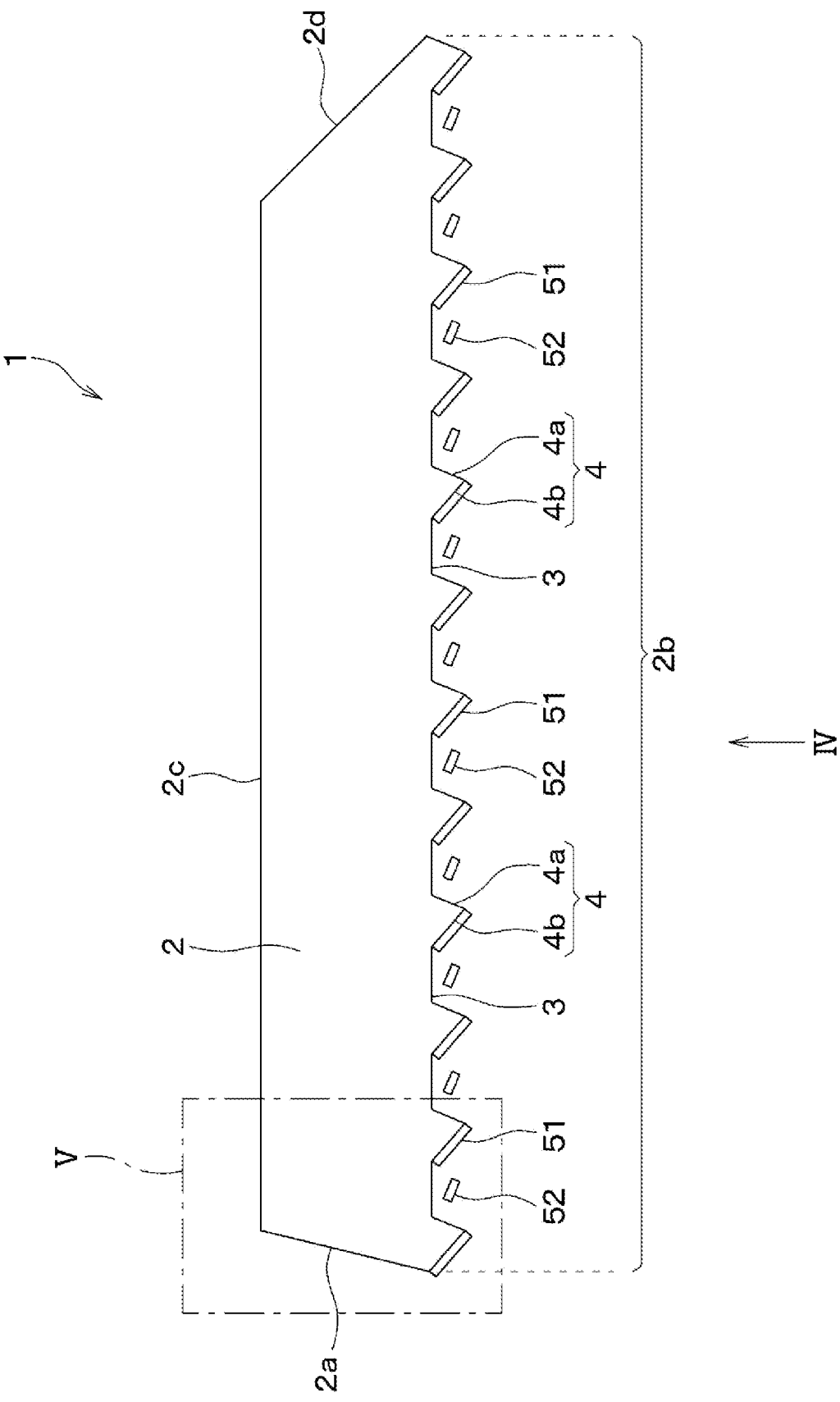
FIG. 2 is a schematic view of the optical device according to the first embodiment.
Figure 3:
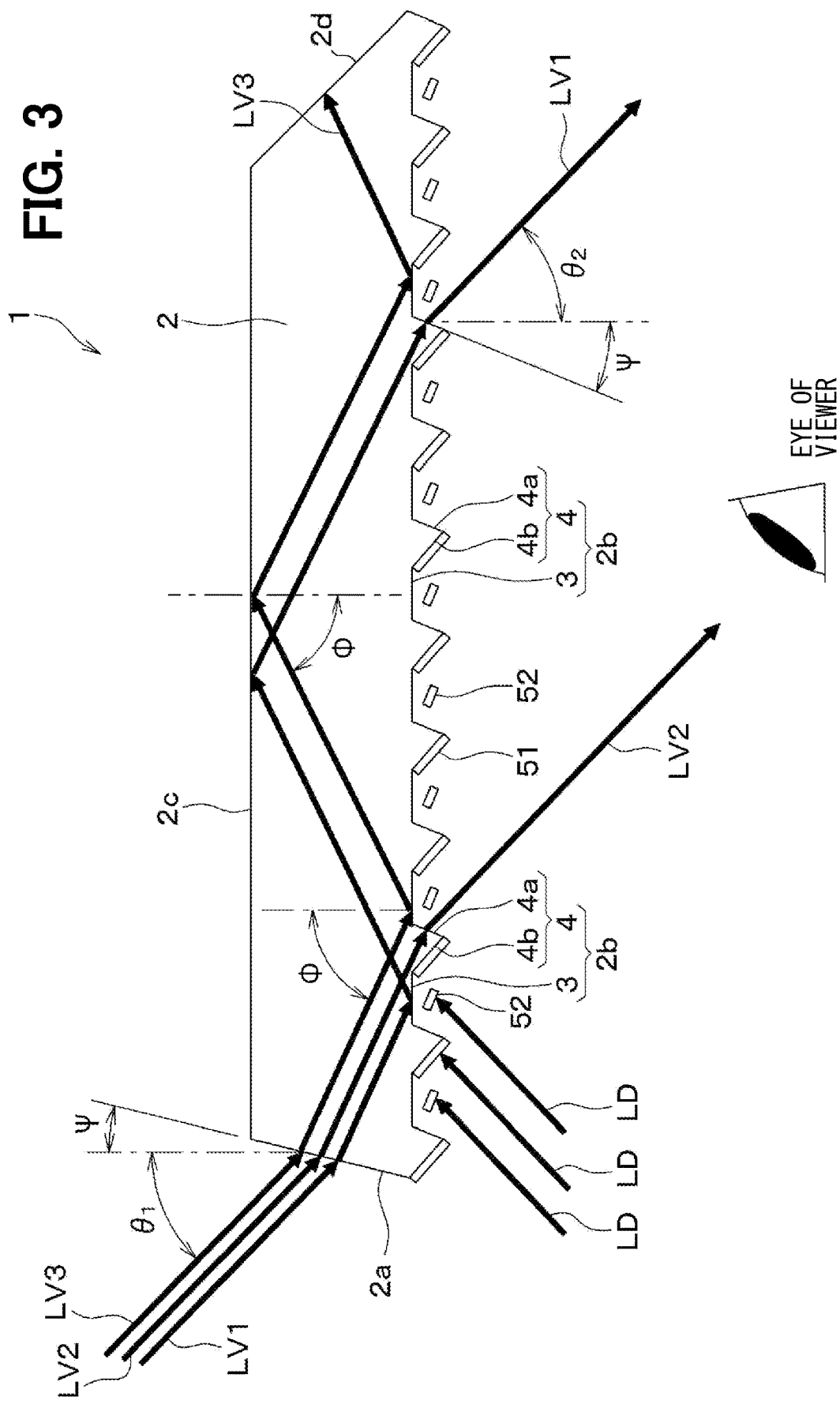
FIG. 3 is a cross-sectional view for explaining optical paths of external scene light and outside light in the optical device according to the first embodiment.
Figure 4:
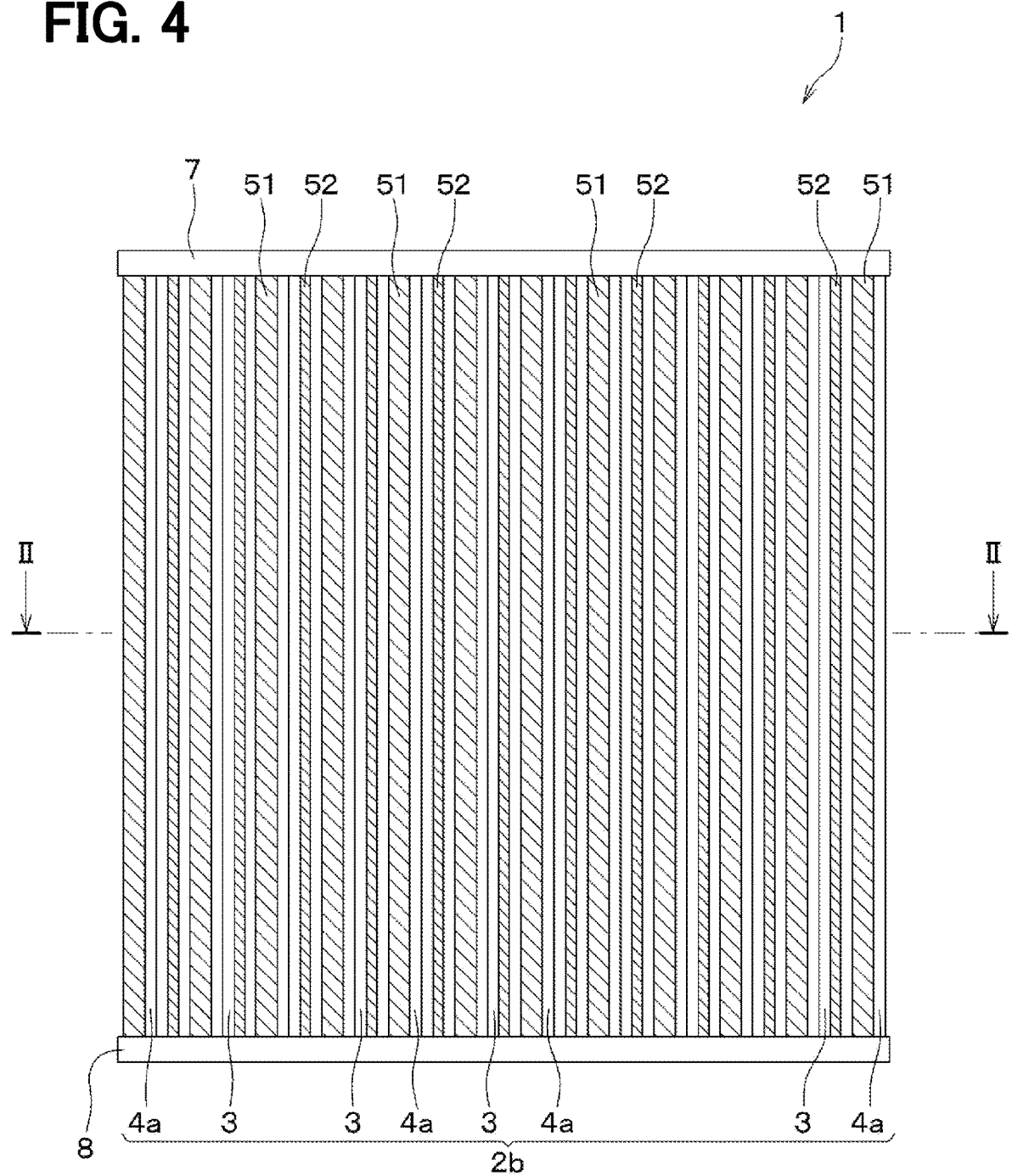
FIG. 4 is a diagram viewed from a direction IV in FIG. 2.

As shown in FIGS. 2 to 4, the optical device 1 includes a light guide 2 and a light shielding portion 51, 52. FIGS. 2 and 3 show cross sections of the optical device 1, but the hatching is omitted to make the drawings easier to see. This also applies to FIGS. 5 to 10. In FIG. 4 viewed from the direction IV of FIG. 2, in order to distinguish the light shielding portion 51, 52 from the light guide 2 and make it easier to see, the light shielding portion 51, 52 is hatched although it is not the cross section.

As shown in FIGS. 2 and 3, the light guide 2 has an incident surface 2a on which light coming from the blind spot area 13 (hereinafter referred to as "external scene light LV") is incident.

The light guide 2 has a first surface 2b where the external scene light LV incident from the incident surface 2a reaches for the first time. The light guide 2 has a second surface 2c opposite to the first surface 2b and a third face 2d opposite to the incident surface 2a to connect the first surface 2b and the second surface 2c. The first surface 2b of the light guide 2 has flat portions 3 and prism portions 4. The flat portions 3 and the prism portions 4 are alternately provided on the first surface 2b. The prism portion 4 has an exit surface 4a facing the viewer 10, and an inclined surface 4b formed opposite to the exit surface 4a not to face the viewer 10 with respect to the external scene light LV entering the incident surface 2a. In each figure, for convenience of explanation, the flat portions 3 and the prism portions 4 are illustrated larger than the actual ones.

The light guide 2 is made of a transparent material, for example, a resin material such as polyethylene terephthalate, polycarbonate, polyethylene, acrylic, or a glass. In FIG. 3, examples LV1, LV2, and LV3 of the external scene light LV are indicated by bold arrows, which enter the incident surface 2a of the light guide 2 from the blind spot area 13, propagate inside the light guide 2, and are emitted from the exit surface 4a toward the viewer 10.

As shown in FIG. 3, the flat portions 3 of the first surface 2b totally reflect the external scene light LV traveling inside the light guide 2 toward the second surface 2c. The second surface 2c is provided so as to oppose the flat portions 3, and totally reflects the external scene light LV reflected by the flat portions 3 toward the first surface 2b. The exit surface 4a of the prism portion 4 outward emits a part of the external scene light LV incident from the incident surface 2a and a part of the external scene light LV reflected by the second surface 2c.

Specifically, the light guide 2 is configured as follows. First, an angle θ1 is defined between the outside scene light LV incident on the incident surface 2a from the outside of the light guide 2 and a normal line of the flat portion 3. Further, an incident angle Φ is defined between the external scene light LV traveling inside the light guide 2 and the normal line of the flat portion 3. At this time, the light guide 2 is configured so as to satisfy a relationship of θ1<Φ . . . (Formula 1).

As shown in FIG. 3, the external scene light LV traveling inside the light guide 2 has the incident angle Φ with respect to the flat portion 3, and the external scene light LV reflected by the flat portion 3 also has the incident angle Φ with respect to the second surface 2c. n1 represents the refractive index of the light guide 2, and n2 represents the refractive index of medium in contact with the light guide 2. In this embodiment, the medium in contact with the light guide 2 is air, and its refractive index n2 is one. The light guide 2 is configured to satisfy a relationship of sin Φ>n2/n1 . . . (Formula 2).

That is, the angles of the incident surface 2a, the flat portion 3, and the second surface 2c, and the material of the light guide 2 are set such that the incident angle Φ of the external scene light LV with respect to the flat portion 3 and the incident angle Φ of the external scene light LV reflected by the flat portion 3 with respect to the second surface 2c are larger than the critical angle. With this configuration, the light guide 2 does not require a semi-transmissive mirror and another mirror, and the external scene light LV incident from the incident surface 2a is totally reflected by the flat portions 3 and the second surface 2c and propagated to the exit surface 4a so as to be emitted to the outside.

In the present embodiment, since the flat portions 3 and the second surface 2c are formed in parallel, the incident angle Φ of the external scene light LV relative to the flat portion 3 and the incident angle Φ of the external scene light LV relative to the second surface 2c are the same. Note that the flat portion 3 and the second surface 2c may be non-parallel to each other while the relationship of Formula 2 is satisfied.

With the above configuration, as shown in FIG. 3, for example, the external scene light LV coming from the blind spot area 13 enters the incident surface 2a at a predetermined incident angle θ1, is refracted, and proceeds to the first surface 2b. Out of the external scene light LV incident from the incident surface 2a, the external scene light LV2 that reaches the exit surface 4a of the prism portion 4 of the first surface 2b the earliest is emitted to the outside from the exit surface 4a.

Of the external scene light LV incident from the incident surface 2a, the external scene lights LV1 and LV3 reach the flat portion 3 of the first surface 2b and are totally reflected at the interface with the outside. The external scene lights LV1 and LV3 travel inside the light guide 2 toward the second surface 2c without being emitted to the outside. The external scene lights LV1 and LV3 that have reached the second surface 2c are again totally reflected at the interface with the outside and travel inside the light guide 2 toward the first surface 2b. A part of the external scene light LV1 is emitted to the outside from the exit surface 4a of one of the prism portions 4 at a predetermined emission angle θ2, and the remaining external scene light LV3 is totally reflected by the flat portion 3.

The external scene light LV3 that does not reach the prism portion 4 even after being repeatedly reflected by the flat portion 3 and the second surface 2c finally reaches the third surface 2d and is emitted to the outside as afterglow. The emission of afterglow may be suppressed by providing a light absorbing film (not shown) or the like on the third surface 2d.

In this way, the external scene lights LV1 and LV3 are alternately reflected by the flat portion 3 and the second surface 2c, and are gradually moved away from the incident surface 2a in the arrangement direction in which the prism portions 4 are arranged. A part of the external scene light LV is emitted from the prism portions 4 toward the viewer 10.

As a result, the area in which the viewer 10 can visually recognize the external scene lights LV1 and LV2 emitted from the light guide 2 can be made larger.

The "incident angle θ1" refers to the angle formed by the incident direction of the external scene light LV on the incident surface 2a and the normal line of the flat portion 3. The "emission angle θ2" refers to the angle formed by the traveling direction of the external scene light LV emitted from the exit surface 4a and the normal line of the flat portion 3. Moreover, in this embodiment, the flat portions 3 and the second surface 2c are parallel, and the incident surface 2a and the exit surface 4a are parallel. That is, as shown in FIG. 3, the angle ψ formed between the incident surface 2a and the normal to the flat portion 3 is the same as the angle ψ formed between the exit surface 4a and the normal to the flat portion 3. Therefore, the incident angle θ1 of the external scene light LV incident on the incident surface 2a is the same as the emission angle θ2 of the external scene light LV emitted from the exit surface 4a.

The light shielding portion 51, 52 has a first light shielding portion 51 provided on the inclined surface 4b of the prism portion 4 and a second light shielding portion 52 provided at a position facing the flat portion 3. A material for the first light shielding portion 51 and the second light shielding portion 52 is, for example, a light absorbing material, a light diffusing material, a retroreflecting material, or the like. The first light shielding portion 51 is provided on each of the inclined surfaces 4b of the prism portions 4. The first light shielding portion 51 is formed on the surface of the inclined surface 4b of the prism portion 4 by an arbitrary process such as printing or vapor deposition. Therefore, the first light shielding portion 51 can block outside light LD coming in all directions from entering the inclined surface 4b of the prism portion 4.

The second light shielding portion 52 is provided for each of the flat portions 3 at a position facing the flat portions 3. As shown in FIGS. 2 and 3, the second light shielding portion 52 is provided at a position away from the flat portion 3 and is not in contact with the flat portion 3. Therefore, since the flat portion 3 is in contact with air, the conditions for total reflection on the flat portion 3 are maintained. As shown in FIG. 4, one end and the other end of the second light shielding portion 52 are fixed to the supports 7 and 8, respectively.

As shown in FIG. 3, the second light shielding portion 52 is located at a position capable of blocking the outside light LD coming in a predetermined direction with respect to the flat portion 3 (hereinafter referred to as "predetermined outside light LD"). If the predetermined outside light LD is reflected by the flat portion 3, after coming toward the flat portion 3 in various directions, the reflected light reaches the eyelips of the viewer 10. Further, if the predetermined outside light LD travels inside of the light guide 2 from the flat portion 3, the predetermined outside light LD is reflected by the second surface 2c and then reaches another flat portion 3 so as to be emitted to reach the eyelips of the viewer 10.

When the optical device 1 is mounted on a vehicle, the eyelips is an eye range of the right eye and the left eye of the viewer 10 (that is, the driver), which is represented as oval in the side view and the plan view, e.g. Japanese Industrial Standard D0021:1998 or ISO 4513:2010.

Figure 5:
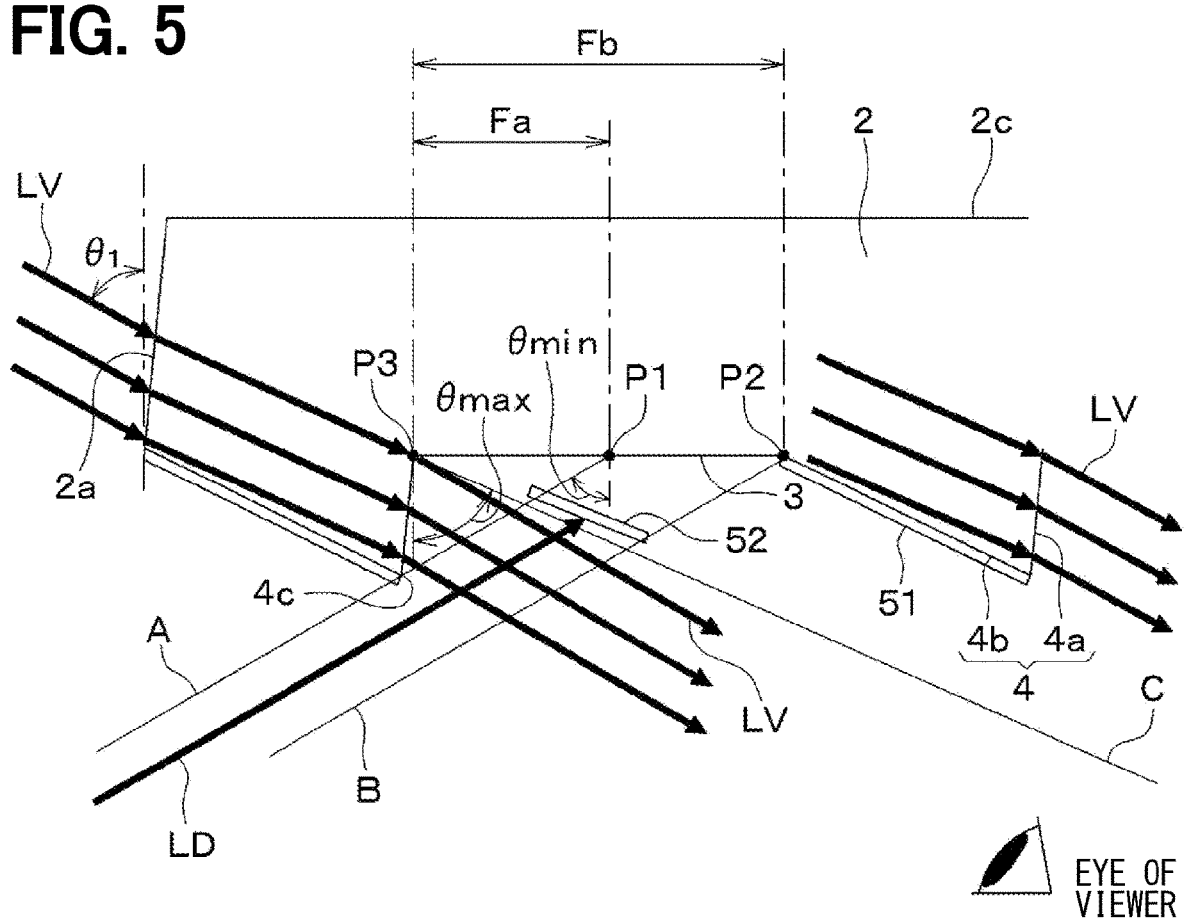
FIG. 5 is an enlarged view of an area V of FIG. 2.

As shown in FIG. 5, the second light shielding portion 52 is arranged so as to overlap the straight line A and the straight line B. Thereby, the second light shielding portion 52 can prevent the predetermined outside light LD from entering the flat portion 3. Further, the second light shielding portion 52 is arranged in a region between the flat portion 3 and the straight line C shown in FIG. 5. Thereby, the second light shielding portion 52 is positioned so as not to block the course of the external scene light LV emitted from the exit surfaces 4a toward the eyelips of the viewer 10. The technical significance of arranging the second light shielding portion 52 at the position defined by the straight lines A, B, and C will be described below.

Figure 6:
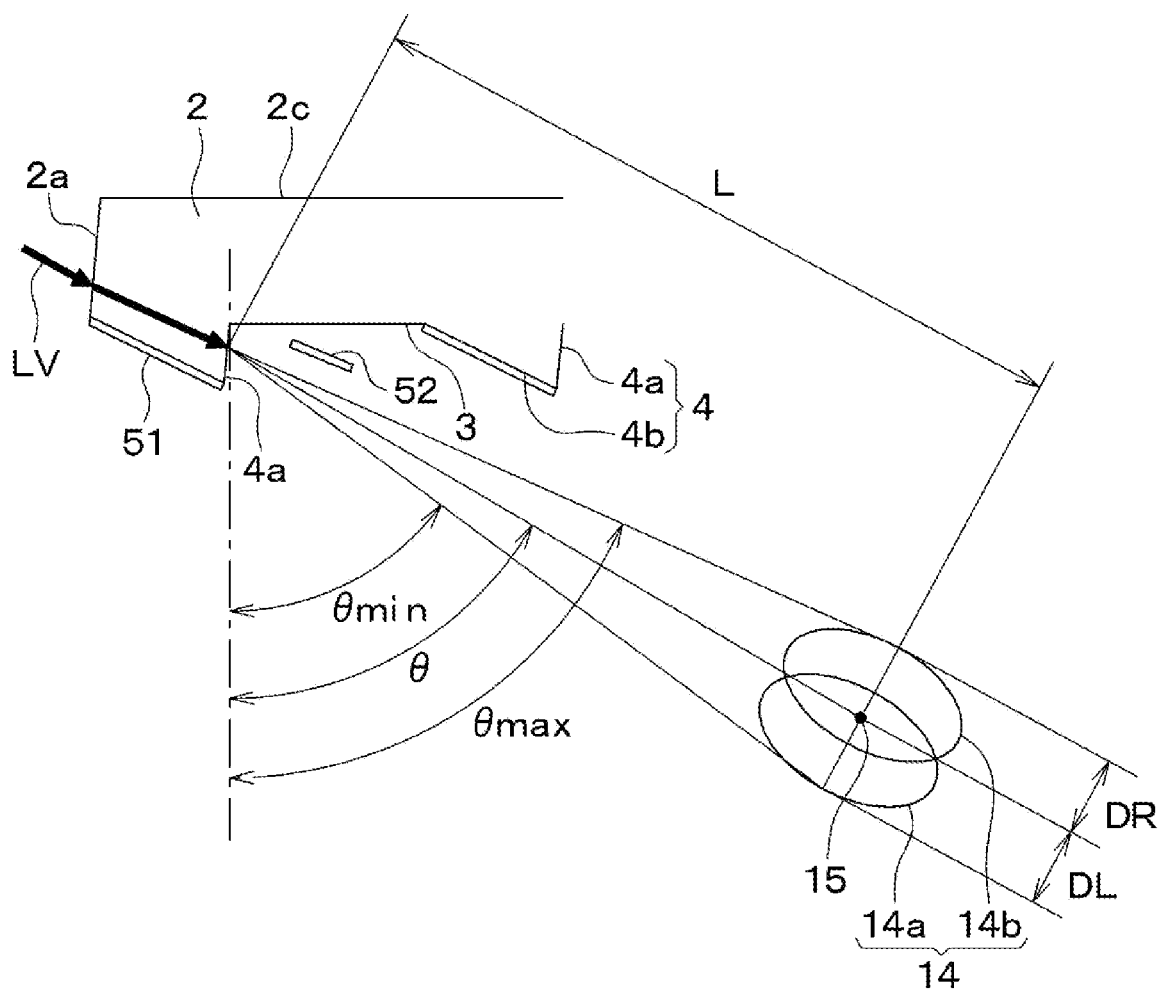
FIG. 6 is a diagram for explaining a positional relationship between the optical device and an eyelips of the viewer.

FIG. 6 is a diagram showing the positional relationship between the optical device 1 and the eyelips 14 of the viewer 10. Since the optical device 1 of the present embodiment is mounted on the "device 11 in which the viewpoint of the viewer 10 is fixed", the positional relationship between the optical device 1 and the eyelips 14 of the viewer 10 is uniquely defined.

As shown in FIG. 6, L represents a distance between the center of a predetermined exit surface 4a (for example, the exit surface 4a closest to the incident surface 2a) of the optical device 1 and the eyepoint center 15 of the viewer 10. The eyepoint center 15 is a point equidistant from the center of the left eyelips 14a and the center of the right eyelips 14b. Generally, the distance L is, for example, about 650 to 700 mm.

DL represents a distance between the eyepoint center 15 of the viewer 10 and an outer edge of the eyelips 14a of the viewer 10 away from the light guide 2 in the direction perpendicular to a line connecting the center of the predetermined exit surface 4a and the eyepoint center 15. Generally, the distance DL is, for example, about 75 mm.

DR represents a distance between the eyepoint center 15 of the viewer 10 and an outer edge of the eyelips 14b of the viewer 10 adjacent to the light guide 2 in the direction perpendicular to the line connecting the center of the predetermined exit surface 4a and the eyepoint center 15. Generally, the distance DR is, for example, about 75 mm. Note that L, DL, and DR are not limited to the exemplified values, and are determined depending on the device 11 (the vehicle type in this embodiment) in which the optical device 1 is mounted.

The angle θ is defined between the normal to the flat portion 3 and the line connecting the center of the predetermined exit surface 4a and the eyepoint center 15 of the viewer 10. The angle θ min is represented by a formula of $\theta - \tan^{-2}(DL/L)$. The angle θ max is represented by a formula of $\theta + \tan^{-1}(DR/L)$. The light guide 2 is designed so that the emission angle θ2 of the external scene light LV that enters the incident surface 2a from the blind spot area 13 and propagates through the light guide 2 to emit from the exit surface 4a is set in a range between θmax and θmin.

As shown in FIG. 5, the straight line A is defined to pass through the point 4c where the exit surface 4a and the inclined surface 4b intersect with each other and to be incident on the flat portion 3 at the angle θ min symmetrical relative to the normal to the flat portion 3. The straight line B is defined to be parallel to the straight line A and to be incident on the point P2 where the inclined surface 4b and the flat portion 3 intersect with each other. The straight line A and the flat portion 3 intersect with each other at the point P1. The straight line B and the flat portion 3 intersect with each other at the point P2. The exit surface 4a and the flat portion 3 intersect with each other at the point P3. The point P2 can also be defined as where the inclined surface 4b and the flat portion 3 intersect. The distance Fa is defined between the point P1 and the point P3. The distance Fb is defined between the point P2 and the point P3. The distance Fb is, for example, about 1 mm.

At this time, the optical device 1 of this embodiment has a relationship of Fa<Fb. That is, the point P1 where the straight line A intersects the flat portion 3 is in the middle of the flat portion 3. The predetermined outside light LD travels in the region between the straight lines A and B, so as to be restricted from reaching the eyelips 14 of the viewer 10 after reflection and penetration on the flat portion 3 after arriving at the flat portion 3 in various directions. Therefore, the second light shielding portion 52 is arranged so as to overlap the straight lines A and B. In other words, the second light shielding portion 52 is arranged so as to shield the area between the straight lines A and B.

When the second light shielding portion 52 is arranged so as to overlap the straight lines A and B, the second light shielding portion 52 can block the predetermined outside light LD incident on the flat portion 3 in a predetermined direction. In other words, the second light shielding portion 52 can restrict the predetermined outside light LD from entering the flat portion 3. The predetermined outside light LD incident on the area opposite to the incident surface 2a with respect to the straight line B is blocked from entering the light guide 2 by the first light shielding section 51.

The external scene light LV emitted from the exit surface 4a and directed toward the eyelips 14 of the viewer 10 travels through the area opposite to the flat portion 3 with respect to the straight line C. Therefore, the second light shielding portion 52 is arranged in a region between the flat portion 3 and the straight line C. Thereby, it is possible to arrange the second light shielding portion 52 at a position that does not hinder the course of the external scene light LV emitted from the exit surfaces 4a toward the eyelips 14 of the viewer 10.

The second light shielding portion 52 can have any shape, arrangement position, and arrangement angle while overlapping the straight lines A and B and being arranged in the region between the flat portion 3 and the straight line C.

An optical device 100 of a comparative example will be described for comparison with the optical device 1 of the first embodiment. Note that the optical device 100 of the comparative example is created by the applicant of the present disclosure, and is not a prior art.

Figure 7:
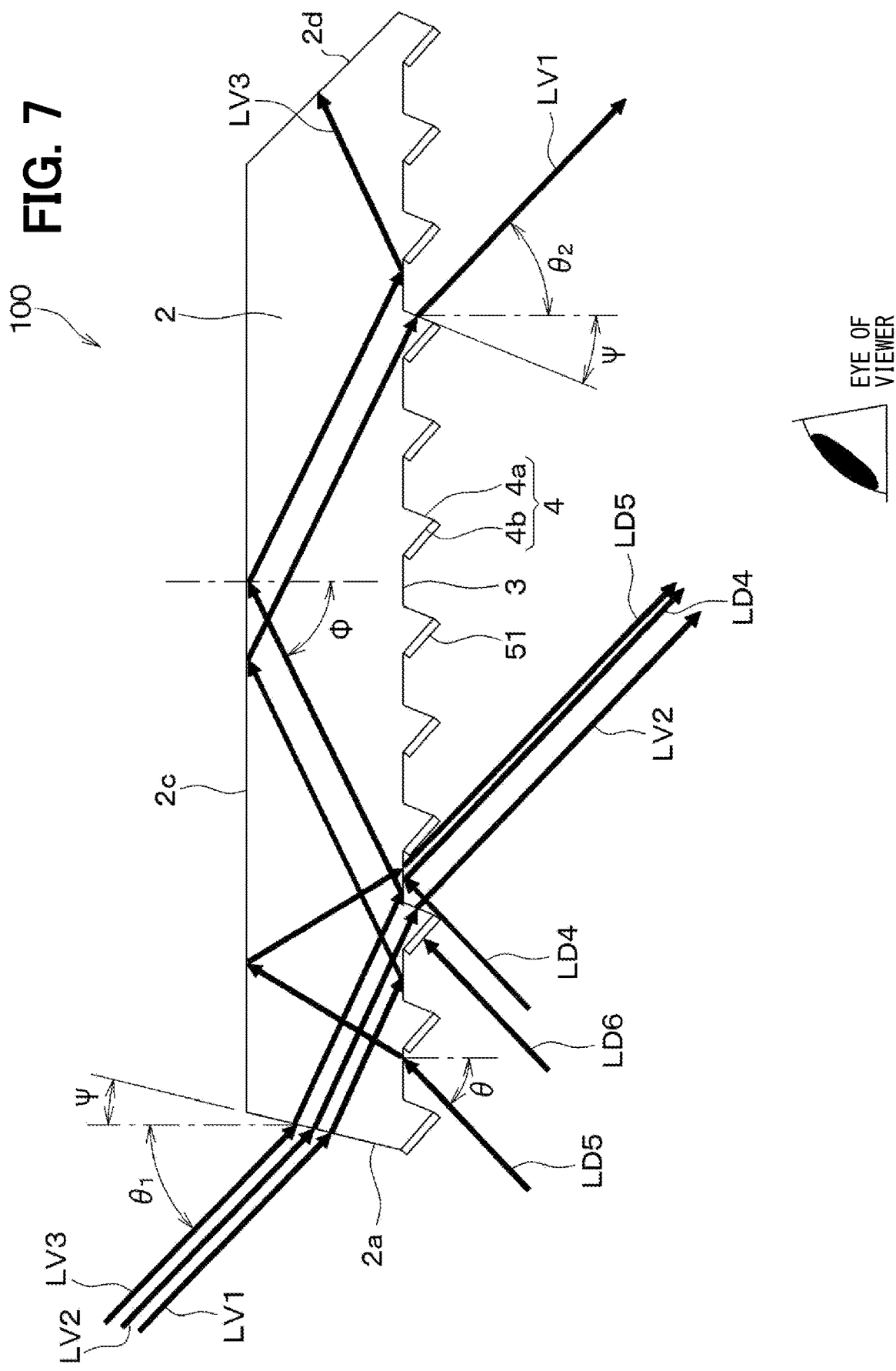
FIG. 7 is a cross-sectional view for explaining optical paths of external scene light and outside light in an optical device of a comparative example.

As shown in FIG. 7, the optical device 100 of the comparative example has the same configuration as the optical device 1 of the first embodiment except that the second light shielding portion 52 is not provided. That is, the optical device 100 of the comparative example includes the first light shielding portion 51 but does not include the second light shielding portion 52. Therefore, in the optical device 100 of the comparative example, the predetermined outside light LD is incident on the flat portion 3. Specifically, for example, as indicated by an arrow labeled LD4 in FIG. 7, a part of the outside light LD4 of the predetermined outside light LD incident on the flat portion 3 is reflected by the flat portion 3 and reaches the eyelips 14 of the viewer 10. Further, as indicated by an arrow labeled LD5, another part of the outside light LD5 of the predetermined outside light LD incident on the flat portion 3 travels from the flat portion 3 inside the light guide 2, is reflected by the second surface 2c, and reaches the eyelips 14 of the viewer 10 from another flat portion 3. In that case, the viewer 10 sees the outside light LD4, LD5 superimposed on the external scene light LV2, LV1 emitted from the optical device 100 of the comparative example, so that the visibility of the external scene image is deteriorated.

Compared with the optical device 100 of the comparative example, the optical device 1 of the first embodiment has the following effects.

(1) The optical device 1 of the first embodiment includes the first light shielding portion 51 for blocking the outside light LD incident on the inclined surface 4b, and the second light shielding portion 52 for blocking the predetermined outside light LD incident on the flat portion 3 in a predetermined direction. The second light shielding portion 52 is arranged so as to overlap the straight line A and the straight line B.

Accordingly, the second light shielding portion 52 prevents the predetermined outside light LD from being reflected by the flat portion 3 toward the eyelips 14 of the viewer 10. Further, the predetermined outside light LD is restricted from traveling from the flat portion 3 into the light guide 2, being reflected by the second surface 2c, and then exiting from another flat portion 3 toward the eyelips 14 of the viewer 10. The first light shielding portion 51 also prevents the predetermined outside light LD from traveling from the inclined surface 4b into the light guide 2 and exiting from the flat portion 3 or the exit surface 4a toward the eyelips 14 of the viewer 10. Therefore, the predetermined outside light LD is suppressed from being superimposed on the external scene image of the blind spot area 13 displayed to the viewer 10. Therefore, the optical device 1 can clearly display the external scene image of the blind spot area 13 for the viewer 10 and improve the visibility thereof.

Furthermore, in the first embodiment, the straight line A is defined to pass through the point 4c where the exit surface 4a and the inclined surface 4b intersect and to be incident on the flat portion 3 at the angle θ min symmetrical relative to the normal to the flat portion 3. The second light shielding portion 52 is arranged so as to overlap with the straight line A. Thereby, the second light shielding portion 52 can block the outside light LD arriving at the flat portion 3 at an incident angle equal to or larger than the straight line A. Therefore, the second light shielding portion 52 can prevent the outside light LD from reaching the entire eyelips 14 of the viewer 10.

In the first embodiment, since the second light shielding portion 52 is arranged so as to overlap the straight lines A and B, the second light shielding portion 52 can be placed at a necessary site to prevent the predetermined outside light LD from arriving at the viewer 10.

(2) In the first embodiment, the second light shielding portion 52 is arranged in a region between the flat portion 3 and the straight line C. Accordingly, the second light shielding portion 52 does not block the course of the external scene light LV emitted from the exit surfaces 4a toward the eyelips 14 of the viewer 10. Therefore, the optical device 1 can clearly display the external scene image of the blind spot area 13 to the viewer 10 and improve the visibility thereof.

(3) In the first embodiment, the second light shielding portion 52 and the flat portion 3 are not in contact with each other, and the flat portion 3 is in contact with the air. Accordingly, the condition of total reflection in the flat portion 3 of the light guide 2 can be maintained, and the external scene light LV can be propagated inside the light guide 2.

(4) In the first embodiment, the second light shielding portion 52 is arranged so as not to cover the area through which the external scene light LV emitted from the exit surface 4a toward the eyelips 14 of the viewer 10 passes. Accordingly, the second light shielding portion 52 does not block the course of the external scene light LV emitted from the exit surfaces 4a toward the eyelips 14 of the viewer 10. Therefore, the optical device 1 can clearly display the external scene image of the blind spot area 13 to the viewer 10 and improve the visibility thereof.

(5) In the first embodiment, the second light shielding portion 52 is configured to include any one of a light absorbing material, a light diffusing material, and a retroreflecting material. Accordingly, a material forming the second light shielding portion 52 is exemplified.

(6) In the first embodiment, the external scene light LV traveling inside the light guide 2 has the incident angle Φ with respect to the flat portion 3, and the external scene light LV reflected by the flat portion 3 has the incident angle Φ with respect to the second surface 2c. The refractive index of the light guide 2 is defined as n1, and the refractive index of the medium in contact with the light guide 2 is defined as n2. At this time, the light guide 2 is configured to satisfy the relationship of sin Φ>n2/n1. Accordingly, the flat portion 3 can totally reflect the external scene light LV toward the second surface 2c. Further, the second surface 2c can also totally reflect the external scene light LV reflected by the flat portion 3 toward the first surface 2b. Therefore, the light guide 2 can satisfy total reflection conditions on the flat portion 3 and the second surface 2c without using a semitransmissive mirror and another mirror.

(7) In the first embodiment, the angle θ1 is defined between the external scene light LV incident on the incident surface 2a from the outside of the light guide 2 and the normal to the flat portion 3, and the external scene light LV traveling inside the light guide 2 has the incident angle Φ with respect to the flat portion 3. The light guide 2 is configured to satisfy the relationship of θ1<Φ. Accordingly, the angle of the incident surface 2a is set so that the external scene light LV is totally reflected by the flat portion 3 of the light guide 2.

Second Embodiment

A second embodiment will be described with reference to FIG. 8. The second embodiment differs from the first embodiment in that the arrangement of the second light shielding portion 52 is changed and a total reflection maintaining portion 6 is added. The rest is the same as in the first embodiment, and only the portions different from the first embodiment will be described.

Figure 8:
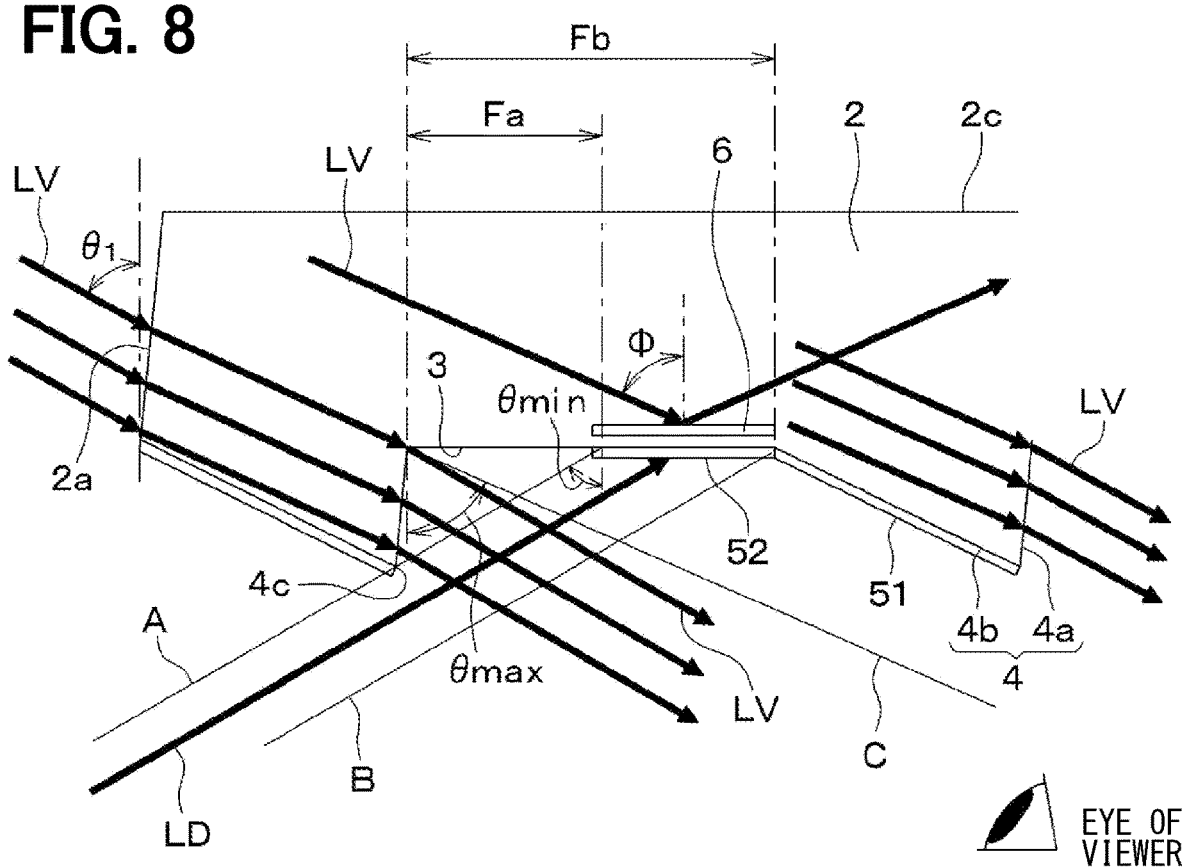
FIG. 8 is an enlarged view showing an optical device according to a second embodiment, corresponding to FIG. 5.

As shown in FIG. 8, the second light shielding portion 52 is in contact with the flat portion 3 in the second embodiment. The second light shielding portion 52 is provided for each of the flat portions 3. As for the material of the second light shielding portion 52, for example, a light absorbing material, a light diffusing material, a retroreflecting material, or the like is used as in the first embodiment. The second light shielding portion 52 can be formed on the surface of the flat portion 3 by any process such as printing or vapor deposition.

The straight lines A, B, and C shown in FIG. 8 are the same as those described in the first embodiment. The second light shielding portion 52 is arranged so as to overlap the straight line A and the straight line B. In other words, the second light shielding portion 52 is arranged so as to shield at least an area between the straight lines A and B on the flat portion 3. As a result, the second light shielding portion 52 can block the predetermined outside light LD incident on the flat portion 3 in the predetermined direction (that is, the outside light LD arriving at the flat portion 3 and being reflected by and entering the flat portion 3 so as to reach the eyelips 14 of the viewer 10).

In addition, since the second light shielding portion 52 is in contact with the flat portion 3, the second light shielding portion 52 is naturally arranged in a region between the flat portion 3 and the straight line C. Therefore, the second light shielding portion 52 does not obstruct the course of the external scene light LV emitted from the exit surface 4a toward the eyelips 14 of the viewer 10.

Furthermore, in the second embodiment, the total reflection maintaining portion 6 is provided inside the light guide 2. The total reflection maintaining portion 6 is provided inside the light guide 2 at a position corresponding to the second light shielding portion 52, between the second surface 2c and the flat portion 3. The total reflection maintaining portion 6 is set to have a size equal to or larger than that of the second light shielding portion 52. A surface of the total reflection maintaining portion 6 adjacent to the second surface 2c is a plane parallel to the flat portion 3. Further, the refractive index of the total reflection maintaining portion 6 is smaller than the internal refractive index of the light guide 2, and the difference between the refractive index of the total reflection maintaining portion 6 and the internal refractive index of the light guide 2 is 0.11 or more. Also in the second embodiment, the angle and material of each part of the light guide 2 are designed so as to satisfy the relationship of Formula 2 described above. In the second embodiment, regarding Formula 2, the total reflection maintaining portion 6 is the medium in contact with a part of the light guide 2. Therefore, in the second embodiment as well, the total reflection condition can be maintained at the interface between the light guide 2 and the total reflection maintaining portion 6, and the external scene light LV can be propagated inside the light guide 2. That is, as shown in FIG. 8, the external scene light LV propagating inside the light guide 2 is totally reflected at the interface of the total reflection maintaining portion 6 adjacent to the second surface 2c.

The total reflection maintaining portion 6 is formed of, for example, an air layer. As a method for manufacturing the total reflection maintaining portion 6, the following method is conceivable. For example, in the manufacturing process, the material of the light guide 2 is composed of plural members, and some of which are provided with a recess for forming the total reflection maintaining portion 6, and then the plural members are joined. Thus, it is possible to form an air layer as the total reflection maintaining portion 6 inside the light guide 2.

The optical device 1 of the second embodiment can achieve the same effects as those of the first embodiment, and can also achieve the following effects.

In the second embodiment, the second light shielding portion 52 and the flat portion 3 are in contact with each other. Further, inside the light guide 2, the total reflection maintaining portion 6 is provided at a position corresponding to the second light shielding portion 52, between the second surface 2c and the flat portion 3. The refractive index of the total reflection maintaining portion 6 is smaller than the internal refractive index of the light guide 2, and the difference between the refractive index of the total reflection maintaining portion 6 and the internal refractive index of the light guide 2 is 0.11 or more. Accordingly, the total reflection condition can be maintained at the interface between the light guide 2 and the total reflection maintaining portion 6, and the external scene light LV can be propagated inside the light guide 2.

Third Embodiment

A third embodiment will be described with reference to FIG. 9. In the third embodiment, the configurations of the second light shielding portion 52 and the total reflection maintaining portion 6 are changed with respect to the second embodiment. Only parts different from the form will be described.

Figure 9:
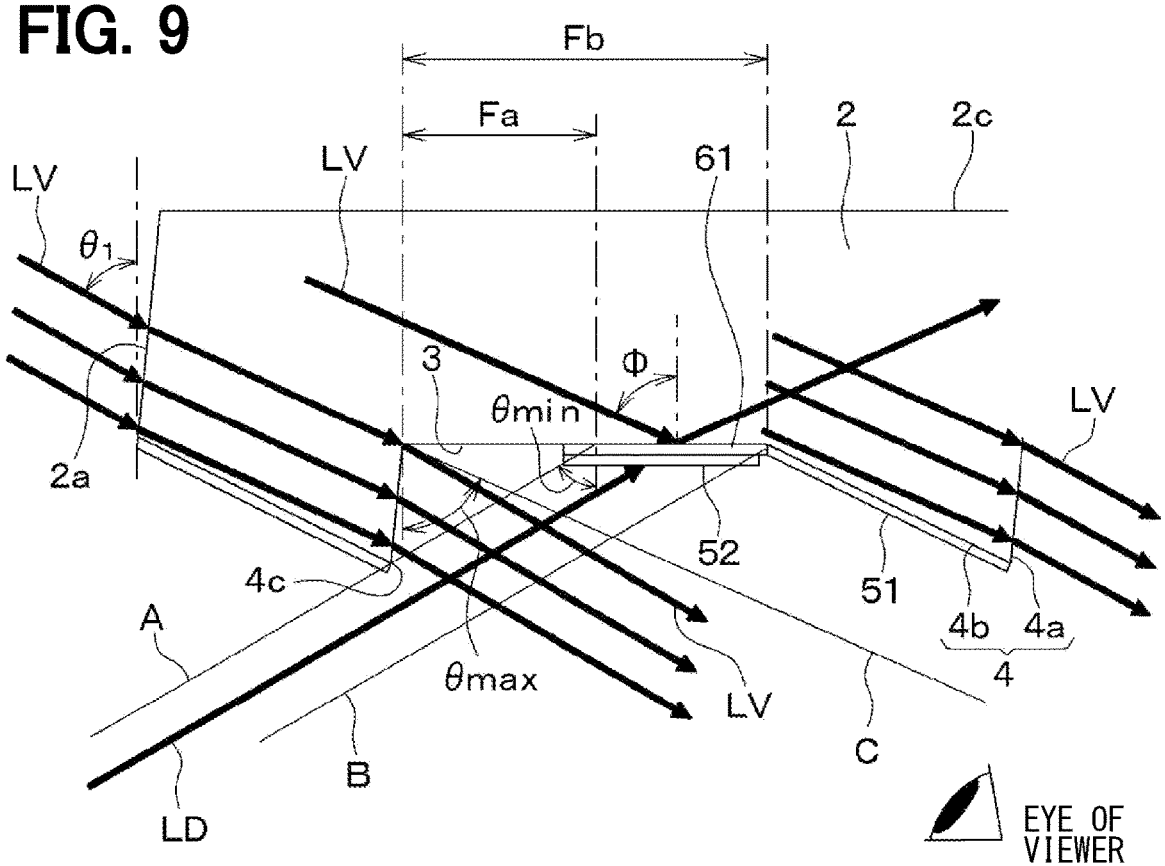
FIG. 9 is an enlarged view showing an optical device according to a third embodiment, corresponding to FIG. 5.

As shown in FIG. 9, in the third embodiment, the flat portion 3 of the light guide 2 and the total reflection maintaining portion 61 are in contact with each other. The second light shielding portion 52 is provided on the total reflection maintaining portion 61 opposite to the light guide 2. The total reflection maintaining portion 61 and the second light shielding portion 52 are provided for each of the flat portions 3. As for the material of the second light shielding portion 52, for example, a light absorbing material, a light diffusing material, a retroreflecting material, or the like is used as in the first embodiment. The second light shielding portion 52 may be in direct contact with the total reflection maintaining portion 61, or another medium (eg, adhesive) may be included between the second light shielding portion 52 and the total reflection maintaining portion 61.

The straight lines A, B, and C shown in FIG. 9 are the same as those described in the first embodiment. The second light shielding portion 52 is arranged so as to overlap the straight line A and the straight line B. In other words, the second light shielding portion 52 is arranged so as to shield at least the area between the straight lines A and B in the flat portion 3. As a result, the second light shielding portion 52 can block the outside light LD incident on the flat portion 3 in a predetermined direction (that is, the outside light LD arriving at the flat portion 3 and being reflected by and entering the flat portion 3, so as to reach the eyelips 14 of the viewer 10.)

Further, the second light shielding portion 52 is arranged in a region between the flat portion 3 and the straight line C. Therefore, the second light shielding portion 52 does not obstruct the course of the external scene light LV emitted from the exit surface 4a toward the eyelips 14 of the viewer 10.

As described above, the total reflection maintaining portion 61 is provided between the flat portion 3 of the light guide 2 and the second light shielding portion 52. The flat portion 3 of the light guide 2 and the total reflection maintaining portion 61 are in surface contact (that is, in close contact). Further, the refractive index of the total reflection maintaining portion 61 is smaller than the internal refractive index of the light guide 2, and the difference between the refractive index of the total reflection maintaining portion 61 and the internal refractive index of the light guide 2 is 0.11 or more. The total reflection maintaining portion 61 is made of magnesium fluoride, for example. Also in the third embodiment, the angle and material of each part of the light guide 2 are designed so as to satisfy the relationship of Formula 2. In the third embodiment, regarding Formula 2, the total reflection maintaining portion 61 is the medium in contact with part of the flat portion 3 of the light guide 2. Therefore, even in the third embodiment, the total reflection condition can be maintained at the interface between the flat portion 3 of the light guide 2 and the total reflection maintaining portion 61, and the external scene light LV can be propagated inside the light guide 2. That is, as shown in FIG. 9, the external scene light LV propagating inside the light guide 2 is totally reflected at the interface between the flat portion 3 and the total reflection maintaining portion 61.

The optical device 1 of the third embodiment can achieve the same effects as those of the first embodiment, and can also achieve the following effects.

In the third embodiment, the total reflection maintaining portion 61 is positioned between the second light shielding portion 52 and the flat portion 3. The total reflection maintaining portion 61 and the flat portion 3 are in contact with each other. The refractive index of the total reflection maintaining portion 61 is smaller than the internal refractive index of the light guide 2, and the difference between the refractive index of the total reflection maintaining portion 61 and the internal refractive index of the light guide 2 is 0.11 or more. Accordingly, since the flat portion 3 and the total reflection maintaining portion 61 are in contact with each other, the total reflection condition in the flat portion 3 can be maintained, and the external scene light LV can be propagated inside the light guide 2.

Other Embodiments (1) In each of the embodiments, a vehicle is described as an example of the "device 11 in which the viewpoint of the viewer 10 is fixed" in which the optical device 1 is mounted. The optical device 1 can be installed in various devices 11 in which the viewpoint of the viewer 10 is fixed.

(2) In each of the embodiments, the prism portion 4 is triangular, but not limited to this, and may be of any shape such as a trapezoid.

Figure 10:
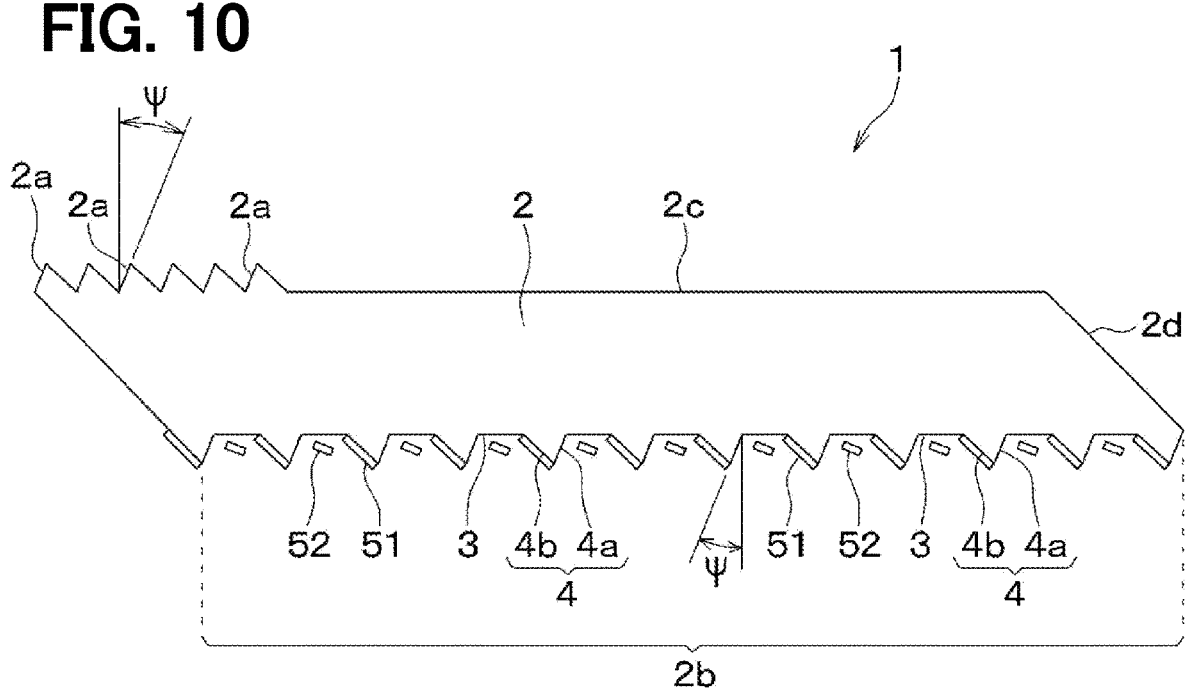
FIG. 10 is a schematic view of an optical device of another embodiment.

(3) In each of the embodiments, the incident surface 2a is formed on the surface connecting the first surface 2b and the second surface 2c. Alternatively, as shown in FIG. 10, the incident surface 2a may be formed by a part of the second surface 2c shaped in a prism shape. In that case, the angle $\psi$ formed between the normal to the flat portion 3 and the incident surface 2a formed on the prism on the second surface 2c is the same as the angle $\psi$ formed between the exit surface 4a and the normal to the flat portion 3.

(4) In each of the embodiments, the second light shielding portion 52 is provided for a part of the flat portion 3 so as to overlap the straight line A and the straight line B. However, the second light shielding portion 52 may be provided to cover all of the flat portion 3.

(5) In each of the embodiments, the right front pillar (that is, the right A pillar) is exemplified as an obstacle provided within the sight in front of the viewer 10. The obstacle may be the left A pillar, B-pillar, C-pillar, or D-pillar, when the optical device is mounted on the vehicle.

The present application is not limited to the above embodiments, and can be appropriately modified within the scope described in the claims. The embodiments described above are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Further, in each of the above embodiments, when the shape of an element or the positional relationship between elements is mentioned, the present disclosure is not limited to the specific shape or positional relationship unless otherwise particularly specified or unless the present disclosure is limited to the specific shape or positional relationship in principle.

What is claimed is:

1. An optical device configured to display an external scene image of a blind spot area for a viewer when an obstacle is within a view field of the viewer, the optical device comprising:
   a light guide having
      an incident surface on which an external scene light coming from a blind area is incident,
      a first surface having a plurality of flat portions and a plurality of prism portions, the external scene light that is incident from the incident surface reaching the first surface for a first time, and
      a second surface located opposite to the plurality of flat portions of the first surface;
   a light shielding portion provided so as to block an outside light from entering the light guide, wherein
   the plurality of flat portions of the first surface totally reflects the external scene light traveling inside the light guide toward the second surface,
   the second surface totally reflects the external scene light reflected by the plurality of flat portions toward the first surface,
   each of the plurality of prism portions has an exit surface for outward emitting a part of the external scene light that is incident from the incident surface and a part of the external scene light reflected by the second surface, and an inclined surface located opposite to the viewer with respect to the exit surface,
   the light shielding portion has a first light shielding portion configured to block-an the outside light that is incident on the inclined surface and a second light shielding portion configured to block the outside light that is incident in a predetermined direction on a flat portion from among the plurality of flat portions,
   in a cross-sectional view including a normal to the exit surface and a normal to the flat portion,
   θ is an angle formed between the normal to the flat portion and a line connecting a center of a predetermined exit surface and an eyepoint center of the viewer,
   L is a distance between the center of the predetermined exit surface and the eyepoint center,
   DL is a distance between the eyepoint center and an outer edge of an eyelips of the viewer away from the light guide in a direction perpendicular to the line connecting the center of the predetermined exit surface and the eyepoint center,
   θ min is an angle represented by θ−tan−1 (DL/L),
   a straight line A passes through a point where the exit surface and the inclined surface intersect with each other and the straight line A is incident on the flat portion with the angle θ min symmetrical relative to the normal to the flat portion,
   a straight line B is parallel to the straight line A and incident on a point where the inclined surface and the flat portion intersect with each other,
   a point P1 where the straight line A intersects with the flat portion,
   a point P2 where the straight line B intersects with the flat portion,
   a point P3 where the exit surface intersects with the flat portion,
   a distance Fa is defined between the point P1 and the point P3,
   a distance Fb is defined between the point P2 and the point P3,
   Fa<Fb is satisfied,
   the second light shielding portion is arranged so as to overlap the straight line A and the straight line B,
   the second light shielding portion is positioned away from, and is not in contact with, the flat portion, and
   the flat portion is in contact with air.

2. The optical device according to claim 1, wherein
   DR is a distance between the eyepoint center and an outer edge of the eyelips of the viewer adjacent to the light guide in the direction perpendicular to the line connecting the center of the predetermined exit surface and the eyepoint center,
   θ max is an angle represented by θ+tan−1 (DR/L),
   a straight line C passes through an intersection of the exit surface and the flat portion and is incident on the flat portion at the angle θ max relative to the normal to the flat portion, and
   the second light shielding portion is arranged in a region between the flat portion and the straight line C.

3. The optical device according to claim 1, wherein
   a total reflection maintaining portion is provided between the second light shielding portion and the flat portion,
   the flat portion and the total reflection maintaining portion are in surface contact,
   a refractive index of the total reflection maintaining portion is smaller than an internal refractive index of the light guide, and
   a difference between the refractive index of the total reflection maintaining portion and the internal refractive index of the light guide is larger than or equal to 0.11.

4. The optical device according to claim 1, wherein
   the second light shielding portion is arranged so as not to cover an area through which the external scene light emitted from the exit surface toward the eyelips of the viewer passes.

5. The optical device according to claim 1, wherein
   the second light shielding portion includes any one of a light absorbing material, a light diffusing material and a retroreflecting material.

6. The optical device according to claim 1, wherein
   the external scene light traveling inside the light guide has an incident angle Φ with respect to the flat portion and the external scene light reflected by the flat portion has an incident angle Φ with respect to the second surface,
   n1 is a refractive index of the light guide,
   n2 is a refractive index of medium in contact with the light guide, and
   the light guide is configured to satisfy a relationship of sin Φ>n2/n1.

7. The optical device according to claim 6, wherein
   the flat portion and the second surface extend parallel to each other, and
   the light guide satisfies the relationship of sin Φ>n2/n1.

8. The optical device according to claim 6, wherein
   the flat portion and the second surface extend non-parallel to each other, and
   the light guide satisfies the relationship of sin Φ>n2/n1.

9. The optical device according to claim 1, wherein
   θ1 is an angle formed between the external scene light that is incident on the incident surface from an outside of the light guide and the normal to the flat portion, Φ is an incident angle of the external scene light traveling inside the light guide with respect to the normal to the flat portion, and the light guide is configured to satisfy a relationship of θ1 <Φ.

10. The optical device according to claim 1, wherein

Φ is an incident angle of the external scene light traveling inside the light guide with respect to the normal to the flat portion, and angles of the incident surface, the flat portion, and the second surface, and a material of the light guide are set, such that the incident angle Φ of the external scene light with respect to the flat portion and the incident angle Φ of the external scene light reflected by the flat portion with respect to the second surface are larger than the critical angle.

11. The optical device according to claim 10, wherein the light guide is made of a transparent material that is:
   (i) one of polyethylene terephthalate, polycarbonate, polyethylene, and acrylic, which are resin materials, or
   (ii) a glass.

12. The optical device according to claim 1, wherein the distance L is within a range between 650 to 700 mm, inclusive, and each of the distances DL and DR is about 75 mm.

13. The optical device according to claim 12, wherein the distance Fb is about 1 mm.

14. The optical device according to claim 1, wherein the second light shielding portion has a wall surface provided at a position facing the flat portion to block an outside light incident on the flat portion in the predetermined direction, and a clearance is defined between the second light shielding portion and the flat portion in the predetermined direction.

15. The optical device according to claim 1, wherein the optical device further includes two supports between which the second light shielding portion is supported.

16. The optical device according to claim 15, wherein the second light shielding portion is located between the plurality of prism portions in an arrangement direction of the plurality of prism portions.

* * * * *